United States Patent
Kumhyr

(10) Patent No.: US 7,406,423 B2
(45) Date of Patent: *Jul. 29, 2008

(54) REMOTELY ENFORCING OPERATIONAL PROTOCOLS

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/939,912

(22) Filed: Nov. 14, 2007

(65) Prior Publication Data

US 2008/0065392 A1    Mar. 13, 2008

Related U.S. Application Data

(63) Continuation of application No. 10/246,855, filed on Sep. 19, 2002, now Pat. No. 7,356,474.

(51) Int. Cl.
*G10L 21/00* (2006.01)

(52) U.S. Cl. .................. 704/275; 704/270; 701/209

(58) Field of Classification Search .................. 704/270, 704/275; 701/209
See application file for complete search history.

(56) References Cited

U.S. PATENT DOCUMENTS

| | | | | |
|---|---|---|---|---|
| 5,502,838 A * | 3/1996 | Kikinis | .................. | 713/501 |
| 5,793,882 A * | 8/1998 | Piatek et al. | ................ | 382/115 |
| 5,848,373 A * | 12/1998 | DeLorme et al. | ............ | 701/200 |
| 6,049,272 A * | 4/2000 | Lee et al. | ................ | 340/539.18 |
| 6,106,459 A * | 8/2000 | Clawson | ..................... | 600/300 |
| 6,188,329 B1* | 2/2001 | Glier et al. | ............... | 707/104.1 |
| 6,233,313 B1* | 5/2001 | Farris et al. | ............. | 379/112.01 |
| 6,335,688 B1* | 1/2002 | Sweatte | ................... | 340/573.1 |
| 6,411,874 B2* | 6/2002 | Morgan et al. | ................ | 701/36 |
| 6,563,910 B2* | 5/2003 | Menard et al. | ................ | 379/45 |
| 6,571,174 B2* | 5/2003 | Rigazio et al. | .............. | 701/209 |
| 6,621,422 B2* | 9/2003 | Rubenstein | .................. | 340/988 |
| 6,952,164 B2* | 10/2005 | Junqua | .................. | 340/539.13 |
| 6,960,990 B2* | 11/2005 | McKibbon | ............. | 340/426.35 |
| 7,133,661 B2* | 11/2006 | Hatae et al. | .............. | 455/404.1 |
| 7,148,763 B2* | 12/2006 | Sutardja | ..................... | 331/176 |
| 7,197,419 B2* | 3/2007 | Floyd et al. | ................. | 702/130 |

* cited by examiner

*Primary Examiner*—Michael N Opsasnick
(74) *Attorney, Agent, or Firm*—VanLeeuwen & VanLeeuwen; Justin M. Dillon

(57) ABSTRACT

Remote enforcement of operational protocols is provided. In a remote environment, such as that found with a police environment, voice recognition technology is used to determine the situation and invoke actions according to an appropriate protocol. Actions may be set to be mandatory or discretionary. A secure log is maintained of the actions undertaken. Actions include automatically retrieving data from a remote database, automatically communicating with another unit or headquarters, and automating devices used in the remote environment. Voice recognition technology also extracts data from the user's speech and builds variables used as parameters in performing the actions. Data is returned to the user in either audible or textual form and either played to the user on a speaker or displayed on a display device.

9 Claims, 7 Drawing Sheets

350

| Protocol ID 310 | Mandatory? 320 | Type 330 | Action 340 |
|---|---|---|---|
| 10-38 | Yes | Log | %protocol ID% %timestamp% %GPS% |
| | Yes | Dev | Retrieve GPS Coordinates |
| | Yes | Comm | Report %officer ID% %protocol ID% %GPS% to Dispatch |
| | Yes | Data | DMV data retrieval for %tag ID% |
| | Yes | Data | Retrieve outstanding warrants for owner of %tag ID% |
| | Yes | Data | Stolen automobile check of %tag ID% |
| | Yes | Dev | Commence VIDEO recording |
| | Yes | Dev | Commence AUDIO recording |
| | Yes | Comm | Request backup unit |
| | No | Msg | Officer's discretion - arrest, issue citation, issue warning |
| | Yes | Msg | High speed pursuit of suspect NOT AUTHORIZED |
| | Yes | Dev | Turn ON emergency lights |
| | Yes | Dev | Short Burst of emergency siren |
| 10-99 | Yes | Log | %protocol ID% %timestamp% %GPS% |
| | Yes | Dev | Retrieve GPS Coordinates |
| | Yes | Comm | Report %officer ID% %protocol ID% %GPS% to Dispatch |
| | Yes | Dev | Commence VIDEO recording |
| | Yes | Dev | Commence AUDIO recording |
| | Yes | Comm | Request backup unit |
| | Yes | Msg | Arrest Suspect |
| | No | Msg | High speed pursuit of suspect AUTHORIZED |
| | Yes | Dev | Turn ON emergency lights |
| | Yes | Dev | Turn ON emergency siren |

REMOTELY ENFORCING OPERATIONAL PROTOCOLS

RELATED APPLICATIONS

This application is a continuation application of U.S. Non-Provisional patent application Ser. No. 10/246,855, entitled "System and Method for Remotely Enforcing Operational Protocols," filed on Sep. 19, 2002 now U.S. Pat. No. 7,356,474.

BACKGROUND OF THE INVENTION

1. Technical Field

The present invention relates in general to a system and method for remotely enforcing operational protocols, such as those found in law enforcement environments. More particularly, the present invention relates to a system and method for forcing particular actions to be performed in light of a given operational situation being encountered by a user of the system.

2. Description of the Related Art

Some operational environments, such as those encountered by law enforcement personnel, are high workload environments. These types of environments often allow the worker, such as a police officer, to have a certain amount of discretion when faced with a given operational situation. On the other hand, for protection of both the officer and others, certain actions are deemed mandatory because of the situation. These mandatory actions may be a result of organizational policy, such as that set forth a police department, and may also be statutorily required, such as steps that legally must be taken to place a person in custody.

Modern operational environments, such as that of modern day law enforcement officials, includes a myriad of actions that should be taken or must be taken given an operational situation. Failure to abide by these actions in a law enforcement setting can result in difficulty convicting a potential wrongdoer because of an improper arrest as well as potential danger to the officer or the public. The number of actions that should, or must, be taken, coupled with the dynamic, fast paced environment causes difficulty in personnel remembering and carrying out the appropriate actions.

Moreover, because these environments are remote, little or no direct oversight or supervision is available. While two or more personnel may be assigned a particular location or vehicle, this is not always the case. In addition, personnel "partners" are often not supervisors of the other personnel. Furthermore, budget constraints in many areas, such as law enforcement, often force or encourage the assignment of a single person to a vehicle or location.

What is needed, therefore, is a system and method that remotely enforces operational protocols. Furthermore, what is needed is a system and method that uses voice recognition technology to allow hands-free device automation, automated communications, and automated data retrieval.

SUMMARY

It has been discovered that the aforementioned challenges are resolved using a system and method that uses computing technology to remotely enforce operational protocols. Voice recognition technology is used in remote environments, such as a law enforcement environment, to identify a particular protocol and the actions appropriate for the identified protocol. While some actions may be optional, other actions are mandatory. Many mandatory actions are performed automatically—such as calling for backup and operating various devices in the remote environment. Other mandatory actions that must be performed by the user of the system are communicated to the user so that the user is less likely to fail to proper protocol.

Voice recognition technology receives voice input from the user that is operating in the remote environment. A command processor analyzes the received vocal inputs and determines the applicable protocol as well as the parameters, if any, that apply to the protocol. An example of one parameter that may be used in a law enforcement setting is a suspect's vehicle license plate number. Actions associated with the identified protocol are performed. Again, in a law enforcement setting, such actions may include device automation actions, automated communications actions, and automated data retrieval actions. If the police officer has encountered a probable stolen vehicle, some of the device actions may be to automatically engage the emergency lights and siren, communication actions may be to automatically call for backup, and data retrieval actions may be to request a search of the Department of Motor Vehicle (DMV) records to determine the rightful owner of an automobile.

Some actions may be discretionary in one protocol while mandatory in another. For example, a protocol for stopping a motorist that has sped through a red stop light may allow the officer discretion as to whether to issue a citation. This allows the human element of the police officer's duties to determine whether there is a good excuse, such as rushing to the hospital in an emergency, that weighs against the issuing of a citation. In another protocol, however, such as a drug offense, the protocol may require an arrest or citation to ensure that the officer is not providing any favoritism to drug offenders and to address the more serious nature of the offense.

Location data, such as the officer's position, is also automatically retrieved using GPS technology. The location data allows centralized operations, such as a dispatcher, to automatically send backup to the officer's location without having to rely on landmarks and the like. This allows the officer to pay closer attention to what could be a dangerous situation, rather than looking around for available landmarks.

An activity log is automatically maintained that details the protocols entered by the remote user as well as the actions taken. Technology, such as video and audio recording technology, is employed to both verify the officer's adherence to departmental policy and protocol as well as to gather crucial evidence against a suspect that was identified or apprehended by the officer.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below. In particular, while the description uses a law enforcement setting as an example, many other remote operational environments, such as emergency medical technicians, fire protection, and utility work, have protocols and actions that are covered by the non-limiting disclosure set forth below. In addition, a multitude of private-sector companies and organizations have employees and other workers that operate remotely and could utilize the enforcement of operational protocols as set forth herein.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 3 is an example of two protocols that might be used in a law enforcement environment;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
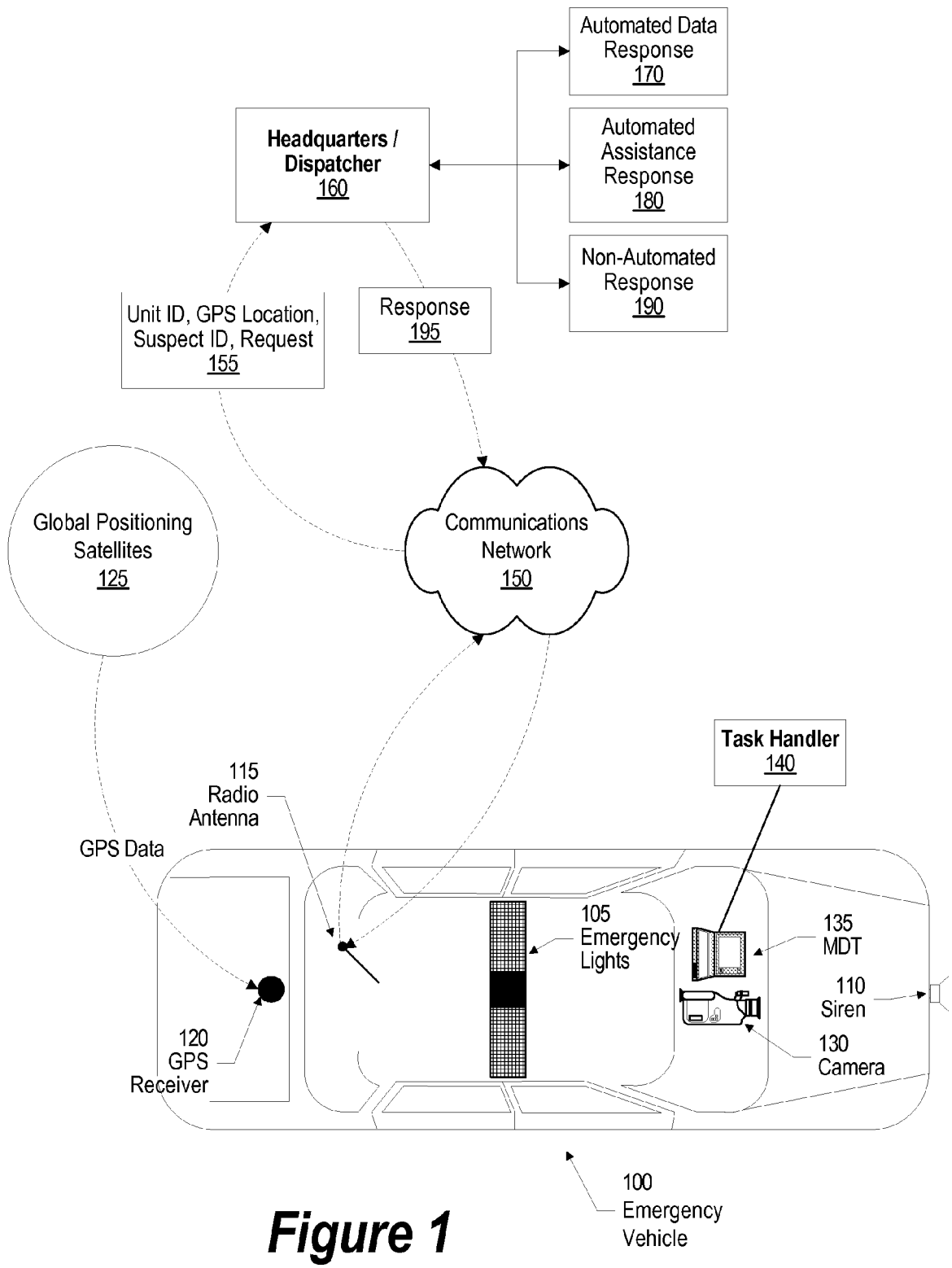
FIG. 1 is a diagram showing a police car acting as a remote center for carrying out actions according to prescribed protocols.

FIG. 1 is a diagram showing a police car acting as a remote center for carrying out actions according to prescribed protocols. Emergency vehicle 100 is shown with an assortment of components used in assisting the police officer in performing law enforcement activities. Task handler 140 is a computer program operating in a computer system within emergency vehicle 100. In the example shown, the task handler is shown operating in the officer's mobile data terminal, or MDT (135). However, the task handler can be executed from any mobile computer system operating within the emergency vehicle.

Emergency vehicle 100 also includes emergency lights 105 for visually alerting other motorists and pedestrians that the officer is responding to an emergency. Likewise, siren 100 is used to alert others with a loud audible sound that the officer is responding to an emergency. Both the emergency lights and siren can be automatically engaged by task handler 140, depending upon the type of protocol that has been identified.

Camera 130 includes a video camera and a microphone for recording sound. The microphone may be integrated with the camera or may be remote, such as clipped onto the officer's uniform for recording statements and comments made by a stopped motorist or suspect. The camera is also able to be turned on and off by the task handler depending upon the identified protocol.

GPS receiver 120 receives global positioning data from global positioning satellites 125. GPS data collected by the GPS receiver is used in communications with other officers and a centralized office to inform others of the officer's location. The officer may be unable to determine an exact location when in locations such as a rural or wilderness area. In other instances, the officer may be too busy pursuing a suspect or may be injured and incapacitated. The GPS data is also usable by task handler 140 as a parameter in various communication actions that may be taken to assist the officer.

Radio antenna 115 is used to communicate with other officers and headquarters 160 through communications network 150. Communications network 150 is typically a wireless network that is capable of transmitting both voice and data. Request 155 is sent from the officer's vehicle to headquarters. The request may be a voice request, or may be a digital request. Each of these types of requests can include information, such as the officer's identifier, the GPS location of the officer, an identifier of a suspect or suspect vehicle, and a particular request. The request may be for a backup unit to be sent to the officer's location to provide assistance, to retrieve information regarding a suspect or a suspect's vehicle, or the like.

Headquarters 160 receives requests and responds with appropriate actions or information. Automated data response 170 is used to retrieve information, such as regarding a suspect vehicle, and return the retrieved information in response 195. The retrieved response can be an auditory signal playable on the radio within the emergency vehicle or may be a textual response that is displayed on MDT 135 located within the emergency vehicle. Automated assistance response 180 includes automatically dispatching a nearby officer to a scene to provide backup as well as dispatching an ambulance to a scene to provide emergency medical assistance. Non-automated response 190 is a response made by a human supervisor or dispatcher to assist the officer. The non-automated response may be whether permission is given to the officer to engage in a high speed pursuit of a suspect, or other types of responses where human decision making is helpful or necessary.

Figure 2:
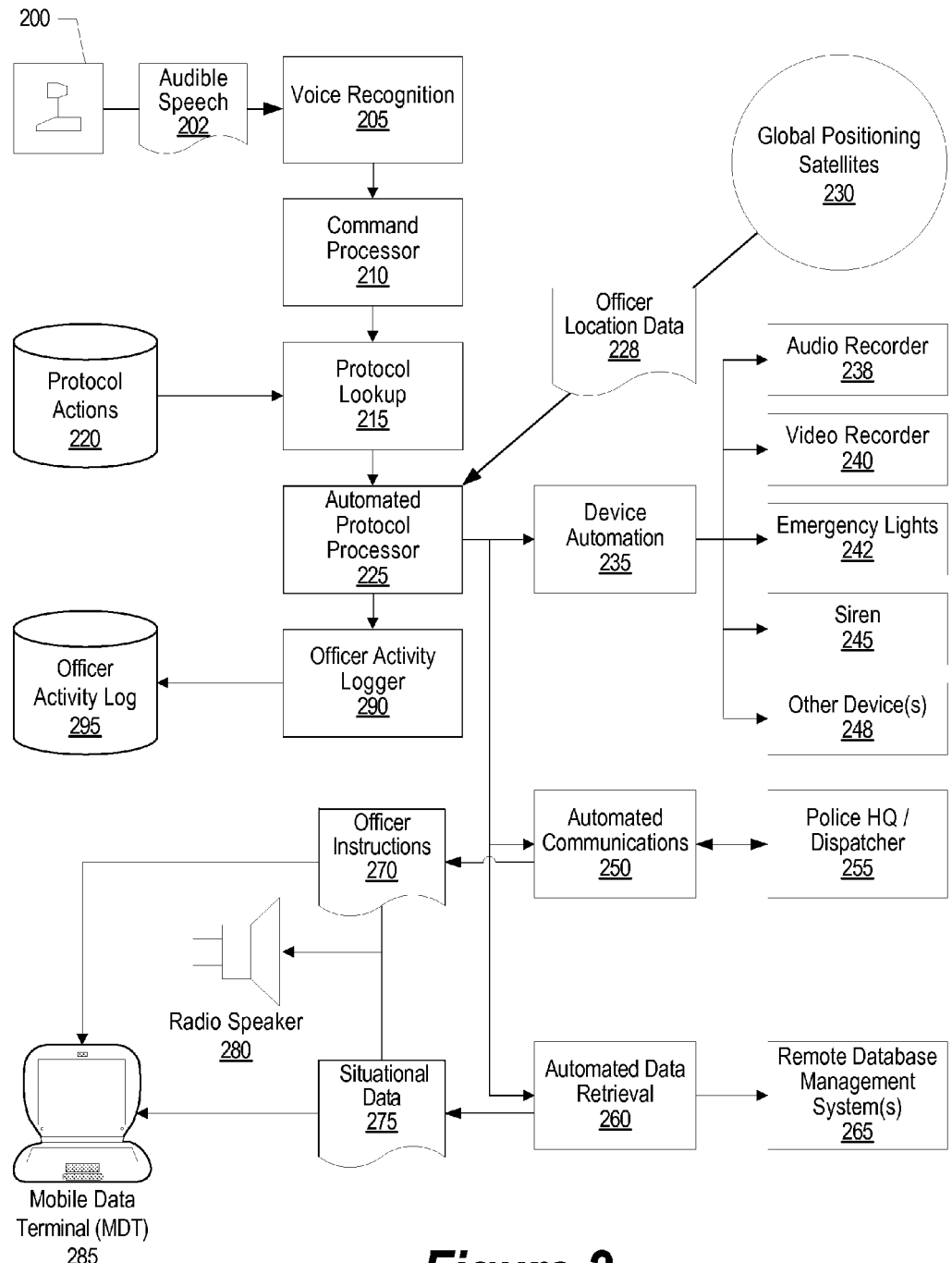
FIG. 2 is a block diagram of components used in remotely enforcing operational protocols.

FIG. 2 is a block diagram of components used in remotely enforcing operational protocols. Microphone 200 is used to receive vocal inputs from the officer. Ideally, the microphone is a wireless microphone that is able to be used by the officer when away from the emergency vehicle. For example, if the officer has walked away from the vehicle towards a suspect, he can still issue commands that are performed by the task handler operating within the vehicle. In addition, a command can be issued to disable the vehicle and/or lock the vehicle so that someone cannot enter the officer's vehicle and drive away. Likewise, the officer can also remotely "unlock" the vehicle and start the engine remotely in order to gain valuable time if a critical emergency has been reported.

Audible speech 202 is received by the microphone and processed by voice recognition technology 205. Voice recognition technology converts the audible speech into a textual form that can be processed by command processor 210. Command processor 210 determines whether the officer has made a protocol statement or is simply talking to another person, either in person or on the phone. When the officer makes a protocol statement, the command processor invokes protocol lookup 215.

Protocol lookup 215 searches a data store for protocol actions 220. These actions may be stored on a nonvolatile storage device, such as a disk drive, or stored in a volatile memory area, such as a memory buffer. Protocol lookup 215 retrieves the actions that apply the to identified protocol. Actions that are performed automatically are processed by automated protocol processor 225.

Automated protocol processor 225 receives information received from the officer that were included with the protocol statement as well as gathering other information, such as current location data 228 which is received from global positioning satellites 230. Automated protocol processor 225 performs the various automated steps that are included for the identified protocol. Device automation 235 includes automation of the audio recorder 238, video recorder 240, emergency lights 242, siren 245, and other devices 248. Other devices may also include the vehicle's ignition system to remotely start or stop the vehicle's engine remotely or to prevent someone from starting the vehicle's ignition using a key.

Automated protocol processor 225 also performs automated communications 250 by transmitting and receiving information from sources 255 such as a central dispatcher, other officers, or the officer's supervisor. Automated protocol processor 225 also performs automated data retrieval operations 260 by communicating with computer systems 265 that include database management systems from which data can be retrieved and delivered to the officer.

Automated communications also includes providing the officer with additional instructions 270 that the officer is expected to follow. For example, if pursuit of a suspect is not permitted or authorized, a message can be played over speaker 280 in the vehicle as well as displayed on MDT 295 instructing the officer to not engage in a high speed pursuit. Situational data 275 is returned from the automated data retrieval process providing the officer with information regarding the current situation, such as whether a vehicle has been reported as stolen and whether a motorist that has been stopped has any outstanding warrants. Similar to the officer instructions, situational data 275 is also playable on radio speaker 280 as well as displayable on MDT 295.

Officer activity logger 290 is used to log the protocols that have been encountered by the officer as well as the actions, both mandatory and discretionary, that were taken by the officer in responding to the situation. This logged data is stored in nonvolatile storage area 295 in a manner making modification of the logged data exceedingly difficult or impossible, such as encrypting the data with a password unknown to the officer. In this manner, data stored in officer's activity log 295 is helpful in ascertaining whether police department policy was followed by the officer as well as in investigating complaints of officer misconduct.

FIG. 3 is an example of two protocols that might be used in a law enforcement environment. Protocol table 300 includes protocol identifier 310, a flag indicating whether an action is mandatory 320, a type of action 330, and an action to be performed 340. The protocol uniquely identifies a set of actions that are performed when a particular situation is encountered. For example, a "10-38" is an example of actions that might be taken for stopping a vehicle for any number of reasons, while a "10-99" protocol is an example of actions that might be taken for a stolen vehicle.

Mandatory flag 320 indicates whether the corresponding action must be taken by the officer (or on behalf of the officer, in the case of an automated action), or whether the action is discretionary. For the traffic stop, the officer has discretion as to whether to issue a citation, arrest the individual for if a more serious infraction is discovered, issue a warning, or allow the motorist to go without a citation or warning. Other actions are mandatory, with many of such actions performed automatically by the task handler. One protocol, such as a 10-38 traffic stop, can be combined with other protocol(s) depending upon the situation encountered. For example, if the data returned to the officer reveals that the automobile is stolen, then the officer initiates the "10-99" protocol for actions taken with a stolen car. For the stolen vehicle, note that high speed pursuit of the suspect is authorized, but not mandatory. In addition, unlike the standard traffic stop, the officer must now arrest the individual driving the stolen vehicle.

Type of action 330 indicates whether the action is to log information, control or automate a device, communicate with headquarters, retrieve data, or provide a message to the officer.

Action 340 is a program script instructing the task handler to perform certain actions. In one embodiment, the actions within a protocol are listed in the sequence in which the actions are to be performed. Embedded in the action's program script are variable tags 350 indicated with a particular delimiter, such as the "%" delimiter shown. For example, during the log action, the protocol identifier, the timestamp, and the officer's GPS coordinates are logged. In addition, the officer's identification number, the protocol, and the officer's GPS location are communicated to dispatch. Data retrieval steps, such as checking to see whether the car is stolen, retrieving the DMV records, and checking outstanding warrants are performed against the license plate number of the suspect's vehicle. Moreover, a single device may be controlled differently depending on the protocol. For example, during the vehicle stop the protocol simply "bursts" the siren to notify the motorist to stop, while during the stolen car protocol, the siren would simply be turned "on" rather than bursting. Using this example, if a motorist ran a stoplight, an officer would initiate pursuit using the 10-38 protocol (i.e. burst the siren), but upon receiving information from headquarters that the automobile was reported stolen the siren would be turned on.

As can be seen by the example shown in FIG. 3, the protocol table describing the actions performed for various protocols can be extensive as well as flexible. Actions for some officers, such as junior officers, may be set as "mandatory," while more experienced officers can be given discretion for the same action. The protocol table can also be modified in light of changes to department policies or changes to applicable law.

Figure 4:
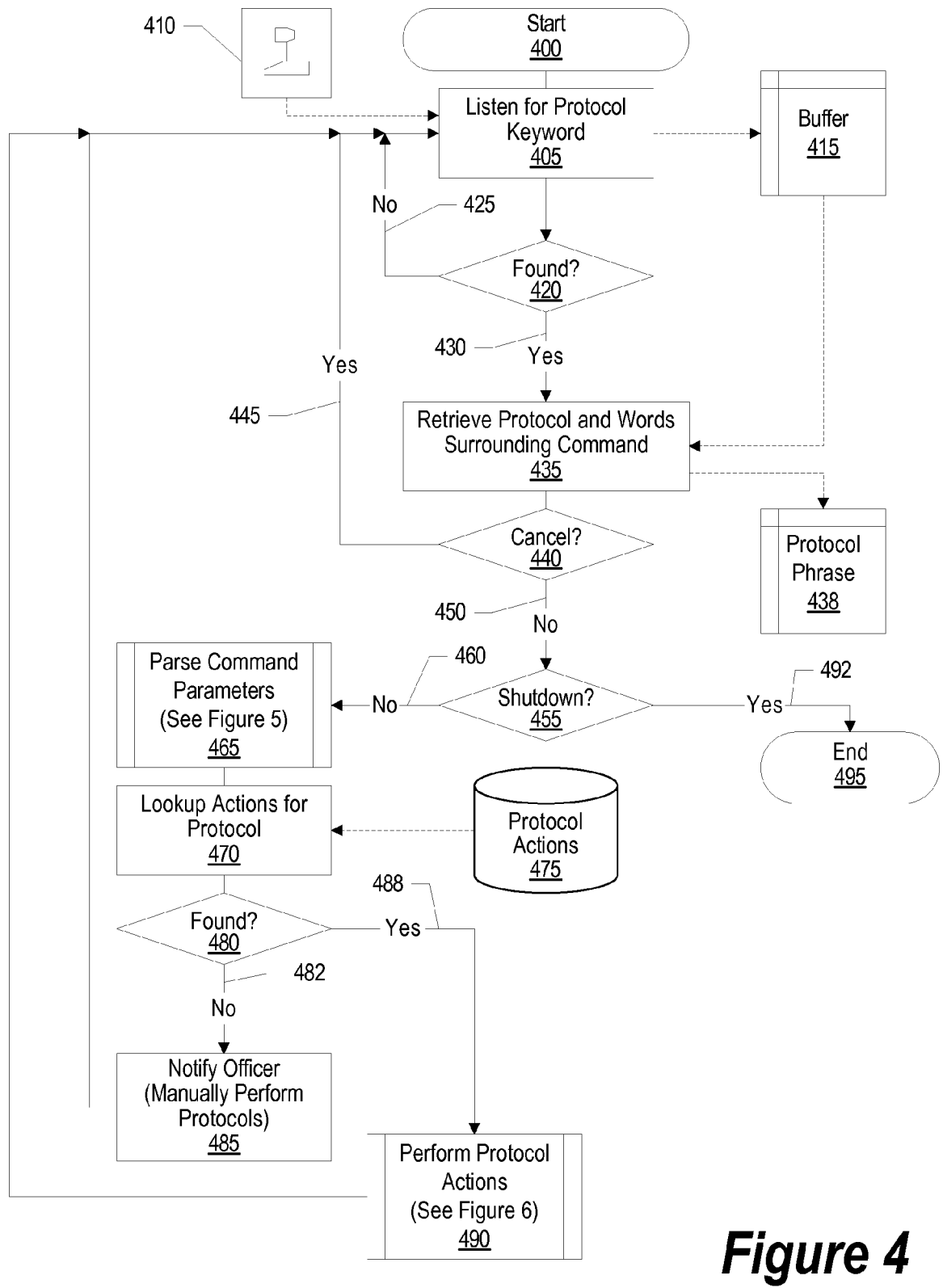
FIG. 4 is a flowchart showing the remote location identifying a situation and using the appropriate protocol.

FIG. 4 is a flowchart showing the remote location identifying a situation and using the appropriate protocol. Processing commences at 400 whereupon voice recognition technology is used to listen (step 405) for one or more protocol keywords (e.g., "10-55," "10-99," etc.). The voice recognition technology receives the voice from the officer that is speaking into microphone 410. The microphone can be fixed to the officer's vehicle or, preferably, wirelessly worn on the officer's uniform so that protocol actions can be initiated regardless of the officer's location. The converted words spoken by the officer are stored in buffer 415 in a text form so that the words before and after the protocol keyword can be analyzed and acted upon when a protocol keyword is detected.

A determination is made as to whether a protocol keyword was detected in the officer's vocal input (decision 420). If a protocol keyword was not found, decision 420 branches to "no" branch 425 which loops back and continues listening for a protocol keyword. On the other hand, if a protocol keyword is detected, decision 420 branches to "yes" branch 430 whereupon the words surrounding the identified protocol are retrieved from buffer 435 (step 415). A determination is made as to whether the user, such as a police officer, has cancelled the protocol (decision 440). If the user has cancelled the protocol, decision 440 branches to "yes" branch 445 whereupon processing loops back to continue listening for protocol keywords. On the other hand, if the user did not cancel the protocol, decision 440 branches to "no" branch 450 whereupon a determination is made as to whether the protocol requested was to shutdown the system (decision 455). If a shutdown request was received, decision 455 branches to "yes" branch 492 whereupon processing ends at 495.

Figure 5:
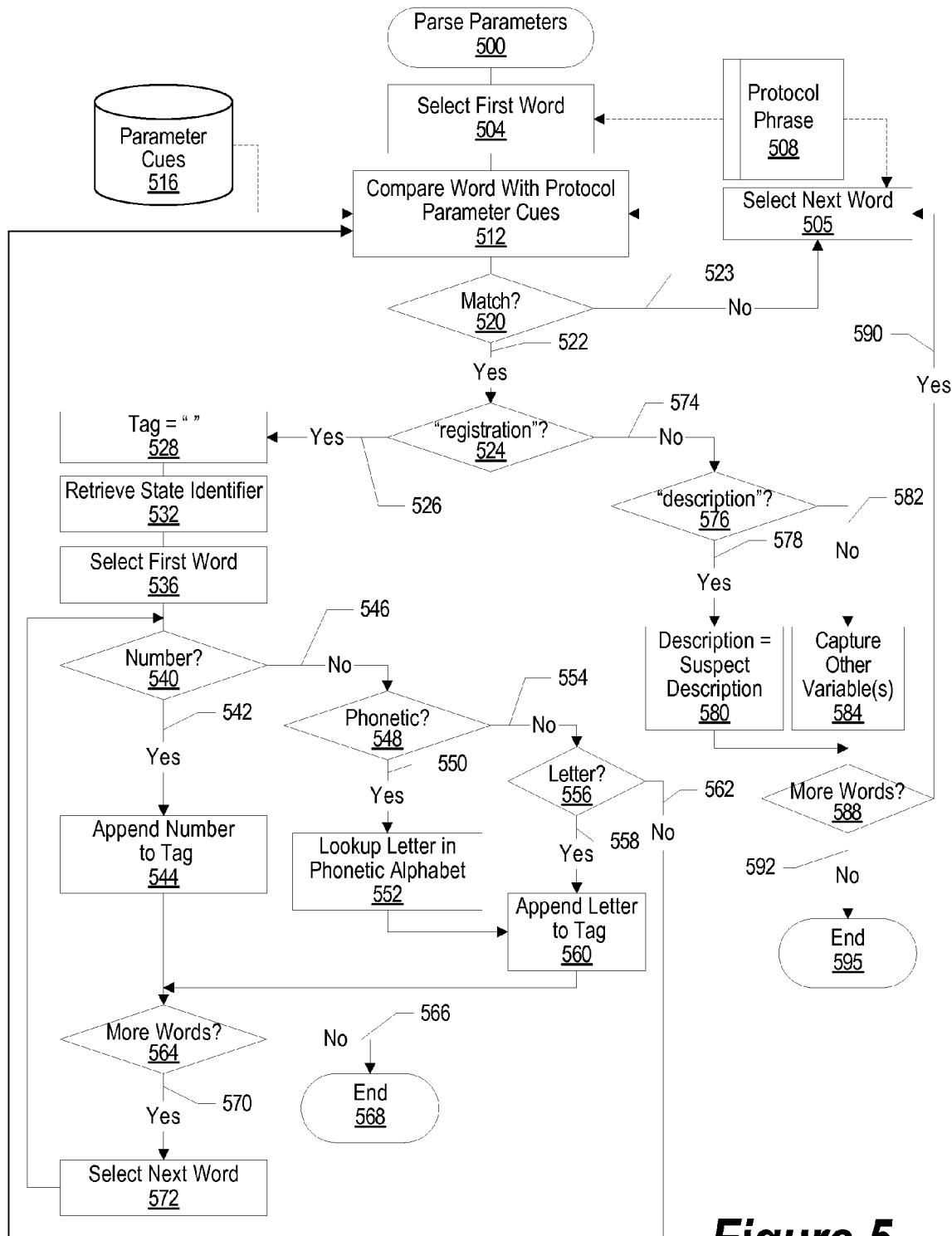
FIG. 5 is a flowchart showing the steps taken to parse parameters from user input and store them for use with protocol actions.

On the other hand, if the protocol was not a shutdown request, decision 455 branches to "no" branch 460 whereupon the command parameters are parsed (predefined process 465, see FIG. 5 for processing details). The actions for the identified protocol are retrieved (step 470) from protocol table 475. A determination is made as to whether protocol actions were found for the identified protocol (decision 480). If protocol actions were not found, decision 480 branches to "no" branch 482 whereupon the officer is notified that automated assistance is not available and the officer should manually perform the steps required by the protocol and processing loops back to continue listening for further protocol keywords. On the other hand, if protocol actions were found for the protocol, decision 480 branches to "yes" branch 488 whereupon the located protocol actions are performed (predefined process 490, see FIG. 6 for processing details). Processing thereafter loops back to continue listening for further protocol keywords.

Processing continues until a shutdown request is received. At that point, decision 455 branches to "yes" branch 492 and processing ends at 495, as described above.

FIG. 5 is a flowchart showing the steps taken to parse parameters from user input and store them for use with protocol actions. In the field, a police officer might issue a vocal call such as "720, 10-38 with NC registration Hotel Whiskey Kilo 345 on highway 55 near Cooper's store. Possible 10-55." In the example above, the "720" is the officer's (or vehicle's) identification number, the "10-38" indicates that the officer is stopping a motor vehicle, the words "NC registration Hotel Whiskey Kilo 345" indicates that the vehicle's license number is HWK 345, wherein the "Hotel Whiskey Kilo" are used to phonetically indicate an H, W, and K, respectively. The processing shown in FIG. 5 parses this information into the appropriate variables.

Processing commences at 500 whereupon the first word is selected (step 504) from the phrase surrounding the protocol stored in buffer 508. The retrieved word is compared with parameter cues 516 to identify the input of a particular parameter (step 512). A determination is made as to whether the selected word matches one of the parameter cues (decision 520). If the selected word does not match a parameter cue, decision 520 branches to "no" branch 523 whereupon the next word is selected (step 505) and processing loops back to process the selected word.

On the other hand, if the word matches a parameter cue, decision 520 branches to "yes" branch 522 to gather data about the particular parameter. A determination is made as to whether the cue is "registration" of a vehicle (decision 524). If the cue is "registration," then decision 524 branches to "yes" branch 526 whereupon a vehicle tag variable is initialized (step 528). The state identifier is retrieved (step 532). In the example above, the "NC" state identifier for North Carolina was provided just before the keyword "registration" was spoken. The state identifier is added to the vehicle tag variable. In the example above, the vehicle tag would now be set to "NC". The first word of the registration is selected (step 536). A determination is made as to whether the word is a number (decision 540). If the word is a number, such as "three", the number (i.e. "3") is appended to the vehicle tag variable (step 544). On the other hand, if the word is not a number, decision 540 branches to "no" branch 546 whereupon a determination is made as to whether the word is a word given to phonetically identify a letter (decision 548). In the example provided above, "Hotel Whisky Kilo" were used to phonetically represent the letters "H," "W," and "K." A phonetic alphabet is used for standard words that phonetically identify letters. If the word is a word used to phonetically identify a letter, decision 548 branches to "yes" branch 550 whereupon the corresponding letter is looked up in the phonetic alphabet (step 552) and the letter is appended to the vehicle tag variable (step 560).

On the other hand, if the word is not a word used to phonetically identify a letter, decision 548 branches to "no" branch 554 whereupon a determination is made as to whether the word spoken is a letter such as "H," "W," or "K" (decision 556). If the word spoken is a letter, decision 556 branches to "yes" branch 558 whereupon the letter spoken is appended to the vehicle tag variable (step 560). On the other hand, if the word spoken is not a number, a word used to phonetically identify a letter, or a letter, then the vehicle tag information is complete and the word falls outside the registration information. In this case, decision 556 branches to "no" branch 562 which loops back to process the selected word.

After a number or letter has been appended to the vehicle tag variable, a determination is made as to whether there are more words to process (decision 564). If there are no more words to process, decision 564 branches to "no" branch 566 whereupon processing ends at 568. On the other hand, if there are more words, decision 564 branches to "yes" branch 570 whereupon the next word is selected from the protocol phrase (step 572) and processing loops back to determine whether the selected word is part of the vehicle license plate identifier.

Returning to decision 524, if the matched parameter cue is not "registration," decision 524 branches to "no" branch 574. A determination is made as to whether the matched parameter word is the word "description" (decision 576). If the word is "description," decision 576 branches to "yes" branch 578 whereupon a suspect (or suspect vehicle) description is retrieved from the protocol phrase and stored in a suspect description variable. On the other hand, if the word is not "description," decision 576 branches to "no" branch 582 whereupon other parameter variables are captured according to the environment and implementation (step 584).

A determination is made as to whether there are more words in the protocol phrase to process (decision 588). If there are more words, decision 588 branches to "yes" branch 590 whereupon the next word from the protocol phrase is selected (step 505) and processing loops back to process the selected word. This looping continues until there are no more words in the protocol phrase to process, at which time decision 588 branches to "no" branch 592 and processing ends at 595.

Figure 6:
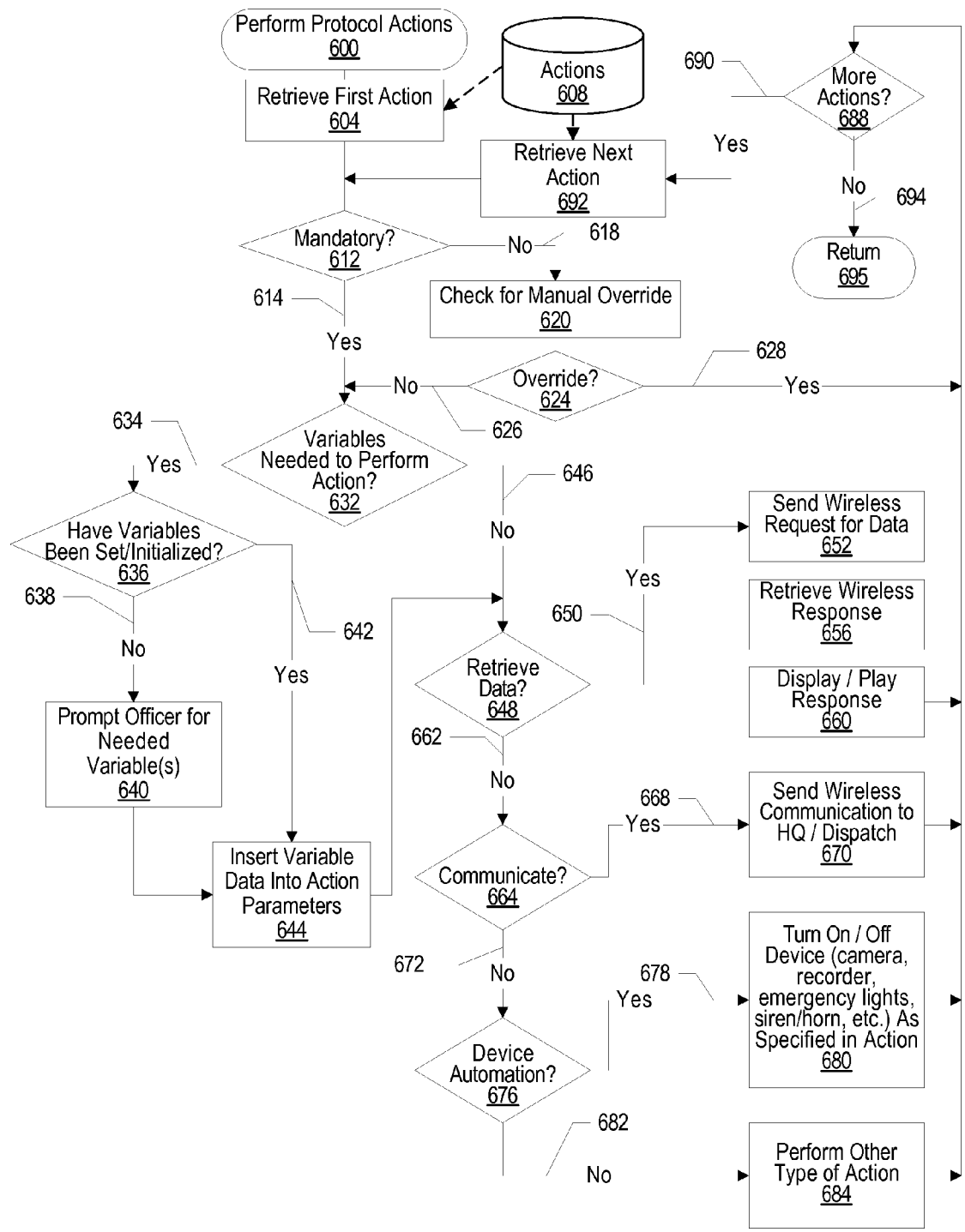
FIG. 6 is a flowchart showing steps taken in performing actions specified by a particular protocol.

FIG. 6 is a flowchart showing steps taken in performing actions specified by a particular protocol. Processing commences at 600 whereupon the first action for the protocol is retrieved (step 604) from protocol actions data store 608.

A determination is made as to whether the selected action is mandatory (decision 612). If the action is not mandatory, decision 612 branches to "no" branch 618 whereupon a manual override check is made (step 620) and a determination is made as to whether the user manually overrode the action (decision 624). If the user did manually override the action, decision 624 branches to "yes" branch 628 whereupon processing loops back to process further actions. If either (i) the user did not override the action (decision 624 branches to "no" branch 626), or (ii) the action is mandatory (decision 612 branches to "yes" branch 614), then a determination is made as to whether variables are needed to perform the action (decision 632).

If variable data is needed to perform the action (e.g., the actions shown in FIG. 3 with variable delimiters) then decision 632 branches to "yes" branch 634 whereupon a determination is made as to whether the needed variables have been set or initialized (decision 636). If the variables have not been set or initialized, decision 636 branches to "no" branch whereupon the officer is prompted to provide the needed variable data (step 640). On the other hand, if the variable data has been set or initialized (using the steps shown in FIG. 5), then decision 636 branches to "yes" branch 642. The variable data is inserted into the action script parameters (step 644).

After either the variable data has been inserted into the action parameters, or if variable data is not needed to perform the action (decision 632 branching to "no" branch 646), then a determination is made as to whether the action is to retrieve data (decision 648). If the action is to retrieve data, decision 648 branches to "yes" branch 650 whereupon a wireless data request is sent to a data provider (step 652), a wireless response is received that includes the requested data (step 656), and the requested data is provided to the user by displaying the data or audibly playing the data to the user on a speaker (step 660). Processing then loops back to process the next action.

Returning to decision 648, if the request is not to retrieve data, decision 648 branches to "no" branch 662 whereupon a determination is made as to whether the action is to communicate with headquarters (decision 664). If the action is a communications action, decision 664 branches to "yes" branch 668 whereupon a wireless communication is sent to headquarters or the dispatcher (step 670). Processing then loops back to process the next action.

Returning to decision 664, if the request is not to communicate, decision 664 branches to "no" branch 672 whereupon a determination is made as to whether the action is a device automation action (decision 676). If the action is a device automation action, decision 676 branches to "yes" branch 678 whereupon the device, such as a microphone, video camera, emergency lights, siren, etc., identified in the action is turned on/off or otherwise controlled as specified in the action (step 680). Processing then loops back to process the next action. If the request is not a device automation action, decision 676 branches to "no" branch 682 whereupon another type of action is performed, such as displaying a message to the user or logging information in a data store (step 684). Processing then loops back to process the next action.

When processing loops back, a determination is made as to whether there are more actions to execute for the protocol (decision 688). If there are more actions, decision 688 branches to "yes" branch 690 whereupon the next action is retrieved (step 692) from protocol actions data store 608 and the selected action is processed. This looping continues until there are no more actions to execute for the protocol, at which time decision 688 branches to "no" 694 whereupon processing returns at 695.

Figure 7:
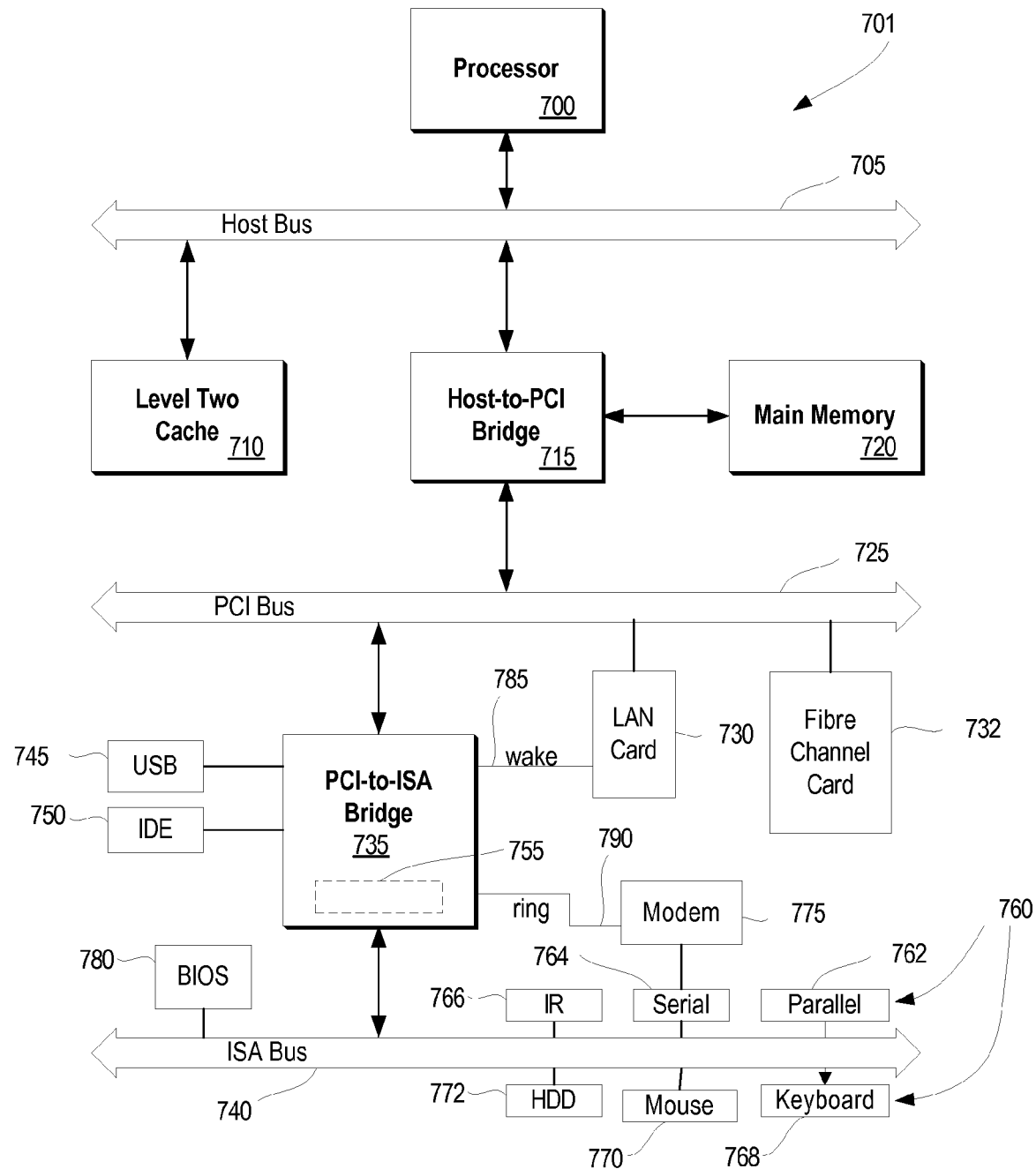
FIG. 7 is a block diagram of an information handling system capable of implementing the present invention.

FIG. 7 illustrates information handling system 701 which is a simplified example of a computer system capable of performing the operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input/output (I/O) devices can be attached to various interfaces 760 (e.g., parallel interface 762, serial interface 764, infrared (IR) interface 766, keyboard interface 768, mouse interface 770, fixed disk (HDD) 772 coupled to ISA bus 740.

Alternatively, many I/O devices can be accommodated by a super I/O controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, and read only memory. In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
   one or more processors;
   a memory accessible by the processors;
   a nonvolatile storage device accessible by the processors;
   a input mechanism for receiving input actions from a user; and an automation tool for controlling a plurality of operational subsystems, the automation tool including:

means for receiving a user protocol statement, wherein the user protocol statement is vocal;

means for analyzing the user protocol statement;

means for identifying a particular operational situation based upon the analyzed user protocol statement, the particular operational situation encountered in a particular operational environment and requiring one or more actions to be taken in response to the particular operational situation;

means for retrieving a protocol corresponding to the identified operational situation, the protocol including both system actions and user input actions, wherein at least one of the system actions and user input actions are optional and wherein at least one of the system actions and user input actions are mandatory;

means for automatically performing a first system action as specified in the protocol;

means for determining that a second system action is optional;

means for checking for an action override input from the user in response to determining that the second system action is optional, wherein the action override input corresponds to the second system action;

means for overriding the second system action in response to both receiving the action override input corresponding to the second system action and determining that the second system action is optional; and means for storing the system actions and user input actions to provide a record of the operational situation.

2. The information handling system as described in claim 1 further comprising:

means for identifying one or more action parameters based upon the analyzed user protocol statement; and means for including at least one of the action parameters as a parameter of at least one of the system actions.

3. The information handling system as described in claim 1 further comprising:

means for receiving a license plate identifier as part of the user protocol statement, wherein the license plate identifier includes one or more phonetic alphabet signals;

means for matching the phonetic signal to a letter; and means for inserting the matched letter in the license plate identifier.

4. The information handling system as described in claim 1 wherein performing the first system action further comprises:

means for sending a request signal through a communications network to an information provider;

means for receiving a reply from the information provider; and means for communicating data included in the reply to a user.

5. A computer program product stored on a computer storage media, the computer storage media storing instructions for execution by a computer, which, when executed by the computer, cause the computer to implement a method for control of a plurality of operational subsystems, said method comprising:

receiving a user protocol statement, wherein the user protocol statement is vocal;

analyzing the user protocol statement;

identifying a particular operational situation based upon the analyzed user protocol statement, the particular operational situation encountered in a particular operational environment and requiring one or more actions to be taken in response to the particular operational situation;

retrieving a protocol corresponding to the identified operational situation, the protocol including both system actions and user input actions, wherein at least one of the system actions and user input actions are optional and wherein at least one of the system actions and user input actions are mandatory;

automatically performing a first system action as specified in the protocol;

determining that a second system action is optional;

in response to determining that the second system action is optional, checking for an action override input from the user, wherein the action override input corresponds to the second system action;

overriding the second system action in response to both receiving the action override input corresponding to the second system action and determining that the second system action is optional; and storing the system actions and user input actions to provide a record of the operational situation.

6. The computer program product as described in claim 5 wherein at least one of the system actions is selected from the group consisting of a device automation, an automated communication, and an automated data retrieval.

7. The computer program product as described in claim 5, wherein the method further comprises:

identifying one or more action parameters based upon the analyzed user protocol statement; and including at least one of the action parameters as a parameter of at least one of the system actions.

8. The computer program product as described in claim 5, wherein the method further comprises:

receiving a license plate identifier as part of the user protocol statement, wherein the license plate identifier includes one or more phonetic alphabet signals;

matching the phonetic signal to a letter; and inserting the matched letter in the license plate identifier.

9. The computer program product as described in claim 5 wherein performing the first system action further comprises:

sending a request signal through a communications network to an information provider;

receiving a reply from the information provider; and communicating data included in the reply to a user.

* * * * *